United States Patent
Malhotra et al.

[11] Patent Number: 5,922,117
[45] Date of Patent: Jul. 13, 1999

[54] INK COMPOSITIONS CONTAINING ALCOHOLS

[75] Inventors: Shadi L. Malhotra; Danielle C. Boils, both of Mississauga, Canada

[73] Assignee: Xerox Corporation, Stamford, Conn.

[21] Appl. No.: 08/935,639

[22] Filed: Sep. 23, 1997

[51] Int. Cl.$^6$ ................................................. C09D 11/00
[52] U.S. Cl. ..................................... 106/31.58; 106/31.13; 106/31.43; 106/31.86; 106/31.75
[58] Field of Search .............. 106/31.13, 31.58, 106/31.43, 31.86, 31.75

[56] References Cited

U.S. PATENT DOCUMENTS

| | | | |
|---|---|---|---|
| 4,490,731 | 12/1984 | Vaught | 346/104 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,041,161 | 8/1991 | Cooke et al. | 106/22 |
| 5,121,141 | 6/1992 | Hadimoglu et al. | 346/140 R |
| 5,122,187 | 6/1992 | Schwarz et al. | 106/25 |
| 5,124,718 | 6/1992 | Koike et al. | 346/1.1 |
| 5,151,120 | 9/1992 | You et al. | 106/31.58 |

OTHER PUBLICATIONS

IBM Technical Disclosure Bulletin, vol. 16, No. 4, Sep. 1973, pp. 1168 to 1170, N.C. Loeber et al., "Tactile Display System".

*Primary Examiner*—Deborah Jones
*Assistant Examiner*—Veronica Faison
*Attorney, Agent, or Firm*—E. O. Palallo

[57] ABSTRACT

An ink composition comprised of (1) a liquid alcohol vehicle, (2) a solid alcohol compound, (3) a quaternary compound, (4) a lightfastness UV absorber, (5) a lightfastness antioxidant, and (6) a colorant.

25 Claims, No Drawings

INK COMPOSITIONS CONTAINING ALCOHOLS

REFERENCE TO COPENDING PATENT APPLICATIONS AND PATENTS

Hot melt inks are illustrated in U.S. Pat. No. 5,688,312, U.S. Pat. No. 5,667,568, U.S. Pat. No. 5,700,316, U.S. Pat. No. 5,747,554, and copending patent application U.S. Ser. No. 641,866 (D/95458), the disclosures of each being totally incorporated herein by reference.

Illustrated in copending applications U.S. Ser. Nos. 08/535,929, 08/533,914, 08/535,889 and 08/536,084, field concurrently herewith, the disclosures of which are totally incorporated herein by reference, are related hot melt inks.

A number of the ink components of the copending applications can be selected for the inks of the present invention in embodiments thereof, such as the colorants, ink additives, and the like.

BACKGROUND OF THE INVENTION

The present invention is directed to ink compositions and, more specifically, the present invention relates to semi-solid hot melt inks with for example, a melting point of from about 25° C. to about 40° C., or from about 30 to about 35 degrees Centigrade, and which inks are especially useful for acoustic ink printing, processes and apparatuses, reference, for example, U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in the aforementioned copending applications and patents, such as an acoustic ink printer for printing images on a record medium.

The inks of the present invention in embodiments thereof are comprised of (1) a liquid non-aqueous vehicle with a boiling point higher than, or equal to about 150° C. and lower than, or equal to about 350° C., and more specifically from about 175 to about 325, and yet more specifically from about 225 to about 300 degrees Centigrade, and with a low acoustic loss to thereby reduce, or minimize energy consumption, and which low acoustic loss is for example, about below, or about equal to 60 dB/mm, (2) a solid alcohol additive compound with for example, a melting point of lower than, or about equal to 75° C. and preferably between about 35 to about 74° C. and an low acoustic loss to reduce, or minimize energy consumption, and which acoustic loss is for example, about equal to, or about below 100 dB/mm, (3) a water fastness quaternary compound, (4) a light fastness UV absorber, (5) a light fastness antioxidant, (6) and a colorant such as a dye, a pigment, mixtures thereof, mixtures of pigments, mixtures of dyes, and the like. More specifically, the present invention is directed to semi-solid hot melt acoustic ink compositions comprised of (1) non-aqueous alcohol liquid vehicles with a boiling point of for example, higher than, or equal to about 150° C. and for example, lower than, or equal to about 350° C., and preferably between about 170 and about 300° C., and with a low acoustic loss of for example, below about, or equal to about 60 dB/mm, and preferably in the range of between about 5 to about 40 dB/mm, (2) a non-aqueous solid alcohol paper additive compound with a melting point of for example, lower than about, or equal to about 75° C. and preferably between about 35 and about 74° C., and with a low acoustic loss of for example, about below, or equal to about 100 dB/mm, and preferably in the range of between about 25 to about 80 dB/mm, (3) a waterfastness quaternary compound, (4) a UV absorber, (5) an antioxidant, and (6) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention there is enabled the elimination, or minimization of undesirable paper curl since water is not present, or minimal water is present. It is preferred that there be an absence of water, and when water is not present in the inks a dryer can be avoided thereby minimizing the cost of the acoustic ink jet apparatus and processes.

PRIOR ART

In acoustic ink printing the printhead produces approximately 2.2 picoliter droplets by an acoustic energy process. The ink under these conditions should display a melt viscosity of for example from about 5 to about 10 centipoise or less at the jetting temperature. Furthermore, once the ink is jetted onto the paper, the ink image should be of excellent crease property, and should be non-smearing waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can usually tolerate a temperature up to about 180° C., and preferably up to a temperature of from about 140° C. to about 160° C., the vehicle for the ink should preferably display liquid like properties such as a viscosity of about 1 to about 10 centipoise at a temperature of from about 75° C. to about 170° C., and solidify or harden after jetting onto paper such that the ink displays a hardness value of for example, from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is selected with a melting point above room temperature so that the ink which is melted in the apparatus will not be subject to evaporation or spillage during periods of non-printing.

In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Hot melt ink jets are somewhat similar to thermal ink jets, however, a hot melt ink contains no solvent. Thus, rather than being liquid at room temperature, a hot melt ink is typically a solid or semi-solid with a wax-like consistency. These inks usually need to be heated, for example, to approximately 100° C. before the ink melts and converts into a liquid. With hot melt inks, a plurality of ink jet nozzles are provided in a printhead. A piezoelectric vibrating element is located in each ink channel upstream from a nozzle and wherein piezoelectric oscillations propel ink through the nozzle. After the hot melt ink is applied to the substrate, the ink is resolidified by freezing on the substrate.

Each of these types of known ink jets, however, has a number of advantages and disadvantages. One advantage of thermal ink jets resides in their compact design for the integrated electronics section of the printhead. Thermal ink jets are disadvantageous in that the thermal ink has a tendency to soak into a plain paper medium, and this blurs the print or thins out the print locally thereby adversely affecting print quality. Problems have been encountered with thermal ink jets in attempting to remove moisture from the ink in a rapid manner to prevent the ink from soaking into a plain paper medium.

One advantage of a semi-solid hot melt ink jet is its ability to print on coated substrates such as coated papers and overhead transparencies yielding photographic quality images, since the semi-solid hot melt ink quickly spreads on the surface of the coated paper and transparencies.

U.S. Pat. No. 4,751,528, the disclosure of which is totally incorporated herein by reference, discloses a semi-solid hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level.

Further, U.S. Pat. No. 4,791,439, the disclosure of which is totally incorporated by reference, discloses an apparatus for use with semi-solid hot melt inks having an integrally connected ink jet head and reservoir system, the reservoir system including a highly efficient heat conducting plate inserted within an essentially non-heat conducting reservoir housing.

U.S. Pat. No. 4,840,674, the disclosure of which is totally incorporated herein by reference, discloses an ink composition which comprises a major amount of water, an organic solvent selected for example, from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose semi-solid hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses an ink jet ink which is semi-solid at room temperature. The ink is impulse jetted at an elevated temperature in the range of about 45° C. to about 110° C.

U.S. Pat. No. 4,853,036 and U.S. Pat. No. 5,124,718 disclose an ink for ink jet recording which comprises a liquid composition essentially comprising a coloring substance, a volatile solvent having a vapor pressure of 1 millimeter Hg or more at 25° C., and a solid compound at room temperature.

SUMMARY OF THE INVENTION

While the known ink compositions and processes may be suitable for their intended purposes, a need remains for acoustic semi-solid hot melt ink compositions suitable for thermal ink jet printing. In addition, there is a need for semi-solid hot melt ink compositions which are compatible with a wide variety of plain papers and yield photographic quality images on coated papers. Further, there is a need for semi-solid hot melt ink compositions which generate high quality, lightfast, waterfast images on plain papers. There is also a need for semi-solid hot melt ink jet ink compositions which generate high quality, fast-drying images on a wide variety of plain papers at low cost with high quality text and high quality graphics, and wherein the dye is retained on the paper surface while the ink vehicle can continue to spread within the paper structure. Further, there is a need for semi-solid hot melt ink jet ink compositions which exhibit minimal feathering. Additionally, there is a need for semi-solid hot melt ink jet ink compositions which exhibit minimal intercolor bleed. There is also a need for semi-solid hot melt ink jet ink compositions which exhibit excellent image permanence. Further, there is a need for semi-solid hot melt ink jet ink compositions which are suitable for use in acoustic ink jet printing processes. Additionally, there is a need for semi-solid hot ink compositions suitable for ink jet printing processes wherein the substrate is heated prior to printing and is cooled to ambient temperature subsequent to printing (heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. These and other needs may be achievable with the inks of the present invention in embodiments thereof.

DETAILED DESCRIPTION OF THE INVENTION

In embodiments the ink compositions of the present invention comprise a colorant, such as a pigment, dye, or mixtures thereof, and a liquid vehicle with a low acoustic-loss value of for example less than about 60 dB/mm and preferably between about 5 and about 40 dB/mm, and a boiling point of for example, greater than about, or equal to about 150° C., preferably between about 170 and about 300° C., a solid alcohol additive which functions to primarily even the surface of the substrate selected, such as paper, and wherein the ink colorant does not substantially penetrate into the fibers of the paper, and which solid alcohol possesses a melting point of for example, lower than about, or equal to about, 75° C. and preferably between about 35 and 74° C., an acoustic-loss value of for example less than about, or equal to about 100 dB/mm and preferably between 25 to 80 dB/mm, a waterfastness quaternary compound, a UV absorbing compound, an antioxidant and wherein the colorant is present in various suitable amounts.

Emdodiments of the present invention include an ink composition comprised of (1) a liquid alcohol vehicle with an acoustic-loss value of from about 5 to about 40 dB/mm, (2) a solid alcohol component with a melting point of from about 35 to about 74° C. and an acoustic-loss value of from about 25 to about 80 dB/mm, (3) a quaternary compound with a melting point of from about 40 to about 80° C., (4) a lightfastness UV absorber, (5) a lightfastness antioxidant, and (6) a colorant; a nonaqueous ink composition wherein the liquid alcohol vehicle is present in an amount of from about 0.5 to about 49, or from about 5 to about 25 percent by weight, the solid alcohol component is present in an amount of from about 0.5 to about 49, or from about 5 to about 25 percent by weight, the quaternary compound is present in an amount of from about 69 to about 1, or from about 5 to about 45 percent by weight, the UV absorber is present in an amount of from about 5 to about 0.25, or from about 1 to about 3 percent by weight, the antioxidant is present in an amount of from about 5 to about 0.25, or from about 1 to about 3 percent by weight, and the colorant is present in an amount of from about 0.5 to about 20, from about 1 to about 12, or from about 2 to about 10 percent by weight, and wherein the total of all the ink components is about 100 percent, or about 100 parts, and which ink possesses an acoustic-loss value of from about 10 to about 80, or from about 20 to about 70 dB/mm, and which ink possesses a viscosity of from about 1 centipoise to about 20, and preferably from 1 to about 10 centipoise at a temperature of from about 125° C. to about 165° C.; a nonaqueous ink wherein the liquid alcohol vehicle is selected from the group consisting of (a) cyclic alcohols, (b) aliphatic alcohols, such as alkyl alcohols, (c) amino alcohols, (d) benzyl alcohols, (e) phenethyl alcohols, and the like; a nonaqueous ink wherein the liquid alcohols are selected from the group consisting of (1) (S)-2-(tert-butoxycarbonylamino)-3-cyclohexyl-1-propanol, (2) cycloheptanol, (3) cycloheptane methanol, (4) 1,4-cyclohexane dimethanol, (5) 1,3-cyclohexanediol, (6) cyclohexyl methanol, and (7) 3-cyclohexyl-1-propanol; a nonaqueous ink wherein said vehicle liquid alkyl alcohols are selected from the group consisting of (1) hexyl alcohol, (2) heptyl alcohol, (3) octyl alcohol, (4) nonyl alcohol, (5) decylalcohol, (6) undecyl alcohol, (7) 1-dodecanol, (8) 1,5, pentane diol, and (9) 1,7-heptane diol, and the like; a nonaqueous ink wherein said liquid amino alcohols are selected from the group consisting of (1) 2-(2-amino ethoxy) ethanol, (2) 2-(2-aminoethylamino) ethanol, (3) 3-acetyl-1-propanol, (4) amino-1-propanol, (5) 2-amino-1-butanol, (6) 4-amino-1-butanol, (7) 2-amino-3-methyl-1-butanol, (8) DL-2-amino-1-hexanol, and (9) (S)-(–)-N-(tert-butoxy carbonyl) leucinol; a nonaqueous ink wherein said benzyl alcohols are selected from the group consisting of (1) benzyl alcohol, (2) 3-methyl benzyl alcohol, (3) 2-methoxy benzyl alcohol, (4) 3-methoxybenzyl alcohol, (5) 4-methoxy benzyl alcohol, (6) 2-ethoxy benzyl alcohol, (12) 3,4,5-trimethoxy benzyl alcohol, (7) 3-chloro benzyl alcohol, (8) 2,4-dimethyl benzyl alcohol, (9) 2,5 dimethyl benzyl alcohol, and (10) 3,5-dimethyl benzyl alcohol; a nonaqueous ink wherein said phenethyl alcohols are selected from the group consisting of (1) phenethylalcohol, (2) 2-hydroxy phenethyl alcohol, (3) 3-hydroxy phenethyl alcohol, (4) 2-amino phenethylalcohol, (5) trifluoro methylphenethyl alcohol, and (6) 3-phenyl-1-propanol; a nonaqueous ink wherein the solid alcohol is selected from the group consisting of (a) cyclic alcohols, (b) linear mono alcohols, (c) linear diols, (d) benzyl alcohols, and (e) phenyl alcohols, and the like; a nonaqueous ink wherein said solid alcohol is a cyclic alcohol selected from the group consisting of (1) (tert-butoxy carbonyl)-2-pyrolidine methanol, (2) 1,3-dioxane-5,5-dimethanol, (3) 1-(4-chlorophenyl)-1-cyclopentane methanol, (4) dicyclohexylmethanol, (5) 4-tert-butyl cyclohexanol, (6) 3-aminomethyl-3,5,5-trimethylcyclohexanol, (7) 2,2,6,6-tetrachloro cyclohexanol, (8) 1-adamantane ethanol, (9) 2-amino-3-cyclohexyl- (5) cis-3,5-cyclo hexadiene-1,2-diol, and (10) (+)-cis-p-methane-3,8-diol; a nonaqueous ink wherein said solid mono alcohols are selected from the group consisting of (1) 5-amino-1-pentanol, (2) nitromethanetrispropanol, (3) 3-chloro-1-phenyl-1-propanol, (4) 6-amino-1-hexanol, (5) 2,2,3,3,4, 4,5,5,6,6, 7,7,8,8, 9,9,9-hepta deca fluoro-1-nonanol, (6) 1-tetra decanol, (7) 1-penta decanol, (8) 1-hexadecanol, (9) 1-eicosanol, (10) 1-docosanol, (11) 11-bromo-1-undecanol, and (12) 12-bromo-1-dodecanol; a nonaqueous ink wherein said solid linear diols are selected from the group consisting of (1) 1,6-hexane diol, (2) 1,2-octane diol, (3) 1,8-octane diol, (4) 1,9-nonane diol, (5) 1,10-decane diol, (6) 1,2-decane diol, (7) 1,2-dodecane diol, (8) (1,2-tetradecane diol, (9) 2-methyl-2-propyl-1,3-propanediol, (9) 2,2-diethyl-1,3-propanediol, (10) (2-(hydroxy methyl)-1,3-propanediol, and (10) 2,2,4-trimethyl-1,3-pentanediol; a nonaqueous wherein said solid benzyl alcohols are selected from the group consisting of (1) 4-butoxy benzyl alcohol, (2) 4-ethoxy benzyl alcohol, (3) 2-phenyl benzyl alcohol, (4) 2,4-dimethoxy benzyl alcohol, (5) α-methyl-2-(trifluoromethyl) benzyl alcohol, (6) 2-chloro-6-fluorobenzyl alcohol, (7) 3-benzyloxy benzyl alcohol, (8) 3,5-dimethoxy benzyl alcohol, (9) 2,3-dimethoxy benzyl alcohol, and (10) 3,5-bis (trifluoromethyl) benzyl alcohol; a nonaqueous ink wherein the solid phenephenyl alcohols are selected from the group consisting of (1) 2-phenyl-2-propanol, (2) 3-(4-hydroxy phenyl)-1-propanol, (3) (S)-(–)-1-phenyl-1-butanol, (4) 2-amino-1-phenyl ethanol, (5) 4-methoxy phenethyl alcohol, (6) 3,4-dimethoxy phenethyl alcohol, (7) 2-phenyl-1,2-propane diol, (8) 3-phenoxy-1,2-propane diol, (9) 3-methoxycatechol, and (10) cinnamylalcohol; a nonaqueous ink wherein the quaternary compound is selected from the group consisting of (1) benzylcetyldimethyl ammonium chloride monohydrate, (2) benzylstearyldimethyl ammonium chloride mono hydrate, (3) benzyl tetradecyl dimethyl ammonium chloride dihydrate, (4) cetyl pyridinium bromide monohydrate, (5) hexadecyltributylphosphonium bromide, (6) 1-dodecylpyridinium chloride hydrate, (7) tetramethylammonium fluoride tetrahydrate, (8) perfluoro decyl iodide, and (9) tetraoctylphosphonium bromide; an ink wherein the lightfastness UV absorbing is an ester selected from the group consisting of (1) glycerol 4-amino benzoate, (2) resorcinol mono benzoate, (3) octyl dimethyl amino benzoate, (4) hexadecyl 3,5-di-tert-butyl-4-hydroxybenzoate, (5) octyl salicylate, and (6) octyl methoxy cinnamate; an ink wherein the lightfastness antioxidant is selected from the group consisting of (1) N-stearoyl-4-aminophenol, (2) 2,6-di-tert-butyl-4-cresol, (3) 2,6-di-tert-butyl-α-dimethylamino-4-cresol, (4) 2,2'-isobutylidene-bis (4,6-dimethyl phenol), (5) N-isopropyl-N'-phenyl-phenylene diamine, (6) N-(1,3-dimethylbutyl)-N'-phenylphenylene-diamine, (7) N,N'-di(2-octyl)-4-phenylene diamine, (8) N,N'-bis (1,4dimethyl pentyl)-4-phenylene diamine, and (9) 2,4,6-tris-(N-1,4-dimethyl-pentyl-4-phenylene diamino)-1,3,5-triazine; an ink further containing ink additives, such as biocides, humectants, and the like; a printing process which comprises incorporating into an acoustic ink jet printer the ink of the present invention and causing droplets of the ink to be ejected in imagewise pattern onto a substrate; a process which comprises (a) providing an acoustic ink printer having a pool of the invention ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate; an ink wherein the colorant is selected in a suitable amount, for example from about 0.5 to about 20, or from about 2 to about 12 percent by weight; an ink in accordance wherein the colorant is a dye; an ink in accordance wherein the colorant is a dye of cyan, magneta, yellow, black, or mixtures thereof; an ink composition comprised of (1) a liquid alcohol vehicle, (2) a solid alcohol compound, (3) a quaternary compound, (4) a UV absorber, (5) an antioxidant, and (6) a colorant; and an ink in accordance wherein said (1) liquid alcohol possesses an acoustic-loss value of from about 15 to about 30 dB/mm, (2) said solid alcohol possesses a melting point of from about 45 to about 65° C. and an acoustic-loss value of from about 40 to about 70 dB/mm, (3) said quaternary compound possesses a melting point of from about 50 to about 65° C., and which ink possesses an acoustic-loss value of from about 25 to about 65 dB/mm, and which ink possesses a viscosity of from about 1 centipoise to about 20 centipoise at a temperature of from about 120° C. to about 170° C.

The liquid alcohol vehicle is present in the ink composition in a suitable amount, for example, in an amount of from about 0.5 to about 49 percent by weight, the solid additive is present in an amount of from about 0.5 to about 49 percent by weight, the quaternary compound is present in an amount of from about 69 to about 1 percent by weight, the UV absorber is present in an amount of from about 5 to about 0.25 percent by weight, the antioxidant is present in an amount of from about 5 to about 0.25 percent by weight, and the colorant is present in an amount of from about 20 to about 0.5 percent by weight. The ink composition contains for example, the following composition range amounts in the sequence (1), (2), (3), (4), (5), (6): [0.5+0.5+69+5+5+20=100] to [49+49+1+0.25+0.25+0.5=100].

In embodiments the liquid alcohol vehicle is present in the ink composition in an amount of from about 5 to about 45 percent by weight, the solid alcohol component is present in an amount of from about 5 to about 45 percent by weight, the waterfast quaternary compound is present in an amount of from about 65 to about 7 percent by weight, the UV absorber is present in an amount of from about 5 to about 1 percent by weight, the antioxidant is present in an amount of from about 5 to about 1 percent by weight, and the colorant is present in an amount of from about 15 to about 1 percent by weight. The ink composition preferred composition range amounts are in the aforementioned sequence: [5+5+65+5+5+15=100] to [45+45+7+1+1+1=100]. These, and other composition ranges can be established using a statistical design based on the analyses of the experimental data of viscosity at 150° C., jettability at 150° C., image quality, lightfastness, and waterfastness of various ink compositions.

Embodiments of the present invention include an ink composition comprised of an aliphatic liquid alcohol vehicle including:

(A) cyclic alcohols such as: (1) (S)-2-(tert-butoxycarbonylamino)-3-cyclo hexyl-1-propanol, (2) cycloheptanol, (3) cycloheptanemethanol, (4) 1,4-cyclohexane dimethanol, (5) 1,3-cyclohexanediol, (6) cyclohexylmethanol, and (7) 3-cyclohexyl-1-propanol, all available from Aldrich chemicals, and the like.

(B) alkyl alcohols wherein alkly contains for example, from about 1 to about 25 carbon atoms, such as (1) hexyl alcohol, (2) heptyl alcohol, (3) octyl alcohol, (4) nonyl alcohol, (5), (6) undecyl alcohol, (7) 1-dodecanol, (8) 1,5, pentane diol, and (9) 1,7-heptane diol, all available from Aldrich Chemicals.

(C) amino alcohols such as (1) 2-(2-aminoethoxy) ethanol, (2) 2-(2-amino ethylamino) ethanol, (3) 3-acetyl-1-propanol, (4) amino-1-propanol, (5) 2-amino-1-butanol, (6) 4-amino-1-butanol, (7) 2-amino-3-methyl-1-butanol, (8) DL-2-amino-1-hexanol, and (29) (S)-(-)-N-(tert-butoxycarbonyl) leucinol, and the like all available from Aldrich chemicals.

Embodiments of the present invention include an ink composition comprised of an aromatic liquid alcohol vehicle including:

(D) benzyl alcohols and its derivatives such as (1) benzyl alcohol, (2) 3-methyl benzyl alcohol, (3) alkoxy, like 2-methoxy benzyl alcohol, (4) 3-methoxybenzyl alcohol, (5) 4-methoxy benzyl alcohol, (6) 2-ethoxy benzyl alcohol, (12) 3,4,5-trimethoxy benzyl alcohol, (7) 3-chloro benzyl alcohol, (8) 2,4-dimethyl benzyl alcohol, (9) 2,5 dimethyl benzyl alcohol, (10) 3,5-dimethyl benzyl alcohol (11) 2-benzyloxy ethanol, and the like all available from Aldrich Chemicals.

(E) phenethyl alcohol and its derivatives such as (1) phenethylalcohol, (2) 2-hydroxy phenethyl alcohol, (3) 3-hydroxy phenethyl alcohol, (4) 2-amino phenethylalcohol, (5) trifluoro methylphenethyl alcohol, (6) 3-phenyl-1-propano,a and the like, all available from Aldrich Chemicals. Examples of the solid linear diols are (1) 1,6-hexane diol, (2) 1,2-octane diol, (3) 1,8-octane diol, (4) 1,9-nonane diol, (5) 1,10-decane diol, (6) 1,2-decane diol, (7) 1,2-dodecane diol, (8) 1,2-tetradecane diol, (9) 2-methyl-2-propyl-1,3-propanediol, (9) 2,2-diethyl-1,3-propanediol, (10) (2-(hydroxy methyl)-1,3-propanediol, (10) 2,2,4-trimethyl-1,3-pentanediol, (11) 2,2,3,3, 4,4,5,5-octafluoro-1,6-hexanediol, (12) 2-butyne-1,4-diol, (13) (±)-3,6-dimethyl-4-octyne-3,6-diol, (14) 3,6-dithia-1,8-octanediol, or (15) 2,4,7,9-tetramethyl-5-decyne-4,7-diol, and the like.

Also in embodiments the inks contain a solid benzyl alcohol compound selected for example, from the group consisting of (1) 4-butoxy benzyl alcohol, (2) 4-ethoxy benzyl alcohol, (3) 2-phenyl benzyl alcohol, (4) 2,4-dimethoxy benzyl alcohol, (5) α-methyl-2-(trifluoromethyl) benzyl alcohol, (6) 2-chloro-6-fluorobenzyl alcohol, (7) 3-benzyloxy benzyl alcohol, (16) 3,5-dimethoxy benzyl alcohol, (17) 2,3-dimethoxy benzyl alcohol, (18) 3,5-bis (trifluoromethyl) benzyl alcohol, (19) 2-phenethyl benzyl alcohol, (20) 4-methyl benzyl alcohol, (21) 3-ethoxy-4-methoxy benzyl alcohol, (22) 4-ethoxy-3-methoxy benzyl alcohol, (23) 2-hydroxy-3-methoxy benzyl alcohol, (24) 3,4-dimethyl benzyl alcohol, and (25) 2-amino-3-methyl benzyl alcohol; wherein the solid linear diols is selected from the group consisting of (1) 1,6-hexane diol, (2) 1,2-octane diol, (3) 1,8-octane diol, (4) 1,9-nonane diol, (5) 1,10-decane diol, (6) 1,2-decane diol, (7) 1,2-dodecane diol, (8) (1,2-tetradecane diol, (9) 2-methyl-2-propyl-1,3-propanediol, (9) 2,2-diethyl-1,3-propanediol, (10) (2-(hydroxy methyl)-1,3-propanediol, (10a) 2,2,4-trimethyl-1,3-pentanediol, (11) 2,2,3,3,4,4,5,5-octafluoro-1,6-hexanediol, (12) 2-butyne-1,4-diol, (13) (±)-3,6-dimethyl-4-octyne-3,6-diol, (14) 3,6-dithia-1,8-octanediol, and (15) 2,4,7,9-tetramethyl-5-decyne-4,7-diol; wherein (1) the low acoustic-loss liquid ester vehicles are present in amounts of about 35 percent by weight and include 1,3-cyclohexanediol, trifluoro methylphenethyl alcohol, 3-cyclohexyl-1-propanol, 2-ethoxy benzyl alcohol, (2) the low acoustic-loss solid alcohol compounds are present in amounts of about 35 percent by weight and include 1,3-dioxane-5,5-dimethanol, (+)-cis-p-menthane-3,8-diol, (-)-trans-p-menthane-3,8-diol, 3,6-dithia-1,8-octanediol, (3) the quaternary compound is present in amounts of 20 percent by weight and include benzylcetyldimethyl ammonium chloride monohydrate, cetylpyridinium bromide monohydrate, hexadecyl tributyl phosphonium bromide, 1-dodecyl pyridinium chloride hydrate, (4) the lightfast UV absorber is present in amounts of about 2 percent by weight and include hexadecyl 3,5-di-tert-butyl-4-hydroxy-benzoate, or glycerol 4-amino benzoate, (5) the lightfastness antioxidant is present in amounts of about 3 percent by weight and include N-stearoyl-4-aminophenol, 2,6-di-tert-butyl-4-cresol, or 2,6-di-tert-butyl-α-dimethylamino-4-cresol, and (6) there is present about 6 percent by weight of the colorant including Sudan Red, Sudan Blue, Sudan Yellow, Orasol Black.

Embodiments of the present invention include an ink composition comprised of an aliphatic solid, especially at from about 20 to about 30 degrees Centigrade, alcohol, examples of which are:

(A) cyclic alcohols such as: (1) (tert-butoxy carbonyl)-2-pyrolidine methanol, (2) 1,3-dioxane-5,5-dimethanol, (3) 1-(4-chlorophenyl)-1-cyclopentane methanol, (4) dicyclohexylmethanol, (5) 4-tert-butylcyclohexanol, (6) 3-aminomethyl-3,5,5-trimethylcyclohexanol, (7) 2,2,6,6-tetrachlorocyclohexanol, (8) 1-adamantane ethanol, (9) 2-amino-3-cyclohexyl-(5) cis-3,5-cyclohexadiene-1,2-diol, (10) D,I-1,2-cycloheptane diol, (11) isosorbide, (12) (–)-trans-p-menthane-3,8-diol, (13) menthol, (14) (+)-cis-p-menthane-3,8-diol, (15) cyclododecanemethanol, (16) cis-1,2-cyclo hexanedimethanol, (17) trans-1,2-cyclopentanediol, (18) α-terpineol, all available from Aldrich chemicals.

(B) linear mono alcohols such as (1) 5-amino-1-pentanol, (2) nitromethane trispropanol, (3) 3-chloro-1-phenyl-1-propanol, (4) 6-amino-1-hexanol, (5) 2,2,3,3,4, 4,5,5,6,6, 7,7,8,8, 9,9,9-hepta deca fluoro-1-nonanol, (6) 1-tetra decanol, (7) 1-penta decanol, (8) 1-hexadecanol, (9) 1-eicosanol, (10) 1-docosanol, (11) 11-bromo-1-undecanol, (12) 12-bromo-1-dodecanol, all available from Aldrich Chemicals.

(C) diols such as (1) 1,6-hexane diol, (2) 1,2-octane diol, (3) 1,8-octane diol, (4) 1,9-nonane diol, (5) 1,10-decane diol, (6) 1,2-decane diol, (7) 1,2-dodecane diol, (8) 1,2-tetradecane diol, (9) 2-methyl-2-propyl-1,3-propane diol, (9) 2,2-diethyl-1,3-propanediol, (10) (2-(hydroxymethyl)-1, 3-propanediol, (10) 2,2,4-trimethyl-1,3-pentanediol, (11) 2,2,3,3,4,4,5,5-octafluoro-1,6-hexanediol, (12) 2-butyne-1, 4-diol, (13) (±)-3,6-dimethyl-4-octyne-3,6-diol, (14) 3,6-dithia-1,8-octanediol, (15) 2,4,7,9-tetramethyl-5-decyne-4, 7-diol, all available from Aldrich Chemicals.

Embodiments of the present invention include an ink composition comprised of an aromatic solid alcohol examples of which are:

(D) benzyl alcohol and its derivatives such as (1) 4-butoxy benzyl alcohol, (2) 4-ethoxy benzyl alcohol, (3) 2-phenyl benzyl alcohol, (4) 2,4-dimethoxy benzyl alcohol, (5) α- methyl-2-(trifluoromethyl) benzyl alcohol, (6) 2-chloro-6-fluorobenzyl alcohol, (7) 3-benzyloxy benzyl alcohol, (16) 3,5-dimethoxy benzyl alcohol, (17) 2,3-dimethoxy benzyl alcohol, (18) 3,5-bis(trifluoromethyl) benzyl alcohol, (19) 2-phenethyl benzyl alcohol, (20) 4-methyl benzyl alcohol, (21) 3-ethoxy-4-methoxy benzyl alcohol, (22) 4-ethoxy-3-methoxy benzyl alcohol, (23) 2-hydroxy-3-methoxy benzyl alcohol, (24) 3,4-dimethyl benzyl alcohol, (25)2-amino-3-methyl benzyl alcohol, and the like all available from Aldrich chemicals.

(E) phenyl alcohol derivatives such as (1) 2-phenyl-2-propanol, (2) 3-(4-hydroxy phenyl)-1-propanol, (3) (S)-(–)-1-phenyl-1-butanol, (4) 2-amino-1-phenyl ethanol, (5) 4-methoxy phenethyl alcohol, (6) 3,4-dimethoxy phenethyl alcohol, (7) 2-phenyl-1,2-propane diol , (8) 3-phenoxy-1,2-propane diol, (9) 3-methoxy catechol, (10) cinnamyl alcohol, (11) 4-methyl benzhydrol, (12) 4,4'-difluoro benzhydrol, (13) 2,3,4,5,6-pentafluorobenzhydrol, (14) 4-[4-(trifluoromethyl) phenoxy] phenol, and the like all available from Aldrich Chemicals.

Water fast solid quaternary compounds with a melting point for example lower than about, or eqaul to about 80° C. and preferably between 40° C. to about 80° C. and more preferably between 55° C. to about 70° C. include: (1) benzylcetyldimethyl ammonium chloride monohydrate, (2) benzylstearyldimethyl ammonium chloride mono hydrate, (3) benzyl tetradecyl dimethyl ammonium chloride dihydrate, (4) cetylpyridinium bromide monohydrate, (5) hexadecyltributylphosphonium bromide, (6) 1-dodecylpyridinium chloride hydrate, (7) tetramethylammonium fluoride tetrahydrate, (8) perfluoro decyl iodide, (9) tetraoctylphosphonium bromide, and the like all available from Aldrich Chemicals.

The lightfastness UV absorbing compounds of the ink compositions are for example, selected from the group consisting of (1) glycerol 4-amino benzoate, available as Escalol 106, from Van Dyk Corporation, (2) resorcinol mono benzoate, available as RBM, from Eastman Chemicals, (3) octyl dimethyl amino benzoate, available as Escalol 507, from Van Dyk Corporation, (4) hexadecyl 3,5-di-tert-butyl-4-hydroxy-benzoate, available as Cyasorb UV-2908, #41,320-8, from Aldrich Chemical Company, (5), octyl salicylate, available as Escalol 106, from Van Dyk, (6) octyl methoxy cinnamate, available as Parasol MCX, from Givaudan Corporation, (7) (±)-pantothenol, MP 66–69° C., (Aldrich #29,578-7), and the like.

The inks of the present application preferably contain lightfastness antioxidants such as (1) N-stearoyl-4-aminophenol, available as Sucnox-18, from Hexcel Corporation, (2) 2,6-di-tert-butyl-4-cresol, available as Vulkanox KB, from Mobay Chemicals, (3) 2,6-di-tert-butyl-α-dimethylamino-4-cresol, available as Ethanox 703, from Ethyl Corporation, (4) 2,2'-isobutylidene-bis (4,6-dimethyl phenol), available as Vulkanox NKF, from Mobay Chemicals, (5) N-isopropyl-N'-phenyl-phenylene diamine, available as Santoflex IP, from Monsanto-Chemicals, (6) N-(1,3-dimethylbutyl)-N'-phenyl-phenylene-diamine, available as Santoflex 13, from Monsanto Chemicals, (7) N,N'-di(2-octyl)-4-phenylene diamine, available as Antozite-1, from Vanderbilt Corporation, (8) N,N'-bis (1,4-dimethyl pentyl)-4-phenylene diamine, available as Santoflex 77, from Monsanto Chemicals, (9) 2,4,6-tris-(N-1,4-dimethyl-pentyl-4-phenylene diamino)-1,3,5-triazine, available as Durazone 37, from Uniroyal Corporation, and the like.

Suitable colorants, present for example in an effective amount generally of from about 1 to about 20 percent, and preferably from about 3 to about 12 by weight include pigments and dyes, and the like with solvent dyes being preferred. Any suitable dye or pigment may be selected provided that for example, it is capable of being dispersed or dissolved in the vehicle and is compatible with the other ink components. Colorants include pigment, dyes, mixtures of pigments and dyes, mixtures of dyes, mixtures of pigments, and the like.

Examples of suitable pigments include Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (ASF), Toluidine Red (Aldrich), Scarlet for Thermoplast NSD PS PA (Ugine Kuhlmann of Canada , E.D.Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan III (Red Orange), (Matheson, Colemen Bell), Sudan II (Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks such as Regal 330® (Cabot), Carbon Black 5250, Carbon Black 5750 (Columbia Chemical Company), and the like.

Examples of suitable dyes include Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling agents of the present application. Examples of suitable spirit solvent dyes include Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company). Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc.A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

The inks of the present invention may also contain ink additives, such as humectants, biocides, and the like.

Optional ink additives more specifically include biocides such as Dowicil 150, 200, and 75, benzoate salts, sorbate salts, and the like, present in effective amounts, such as for example an amount of from about 0.0001 to about 2 percent by weight, and preferably from about 0.01 to about 1.0 percent by weight. The amount of biocide is generally present in amounts of from about 10 to 25 milligrams per one gram of ink.

The inks of the present invention can be prepared by any suitable method. For example, a colored semi-solid hot melt ink composition can be prepared by mixing 35 percent by weight of the liquid alcohol vehicle, 35 percent by weight of the solid alcohol with a melting point of lower than about 75° C. and an acoustic-loss value of less than about 100 dB/mm, 20 percent by weight of a waterfast quaternary compound, 2 percent by weight of a lighfast UV absorber, 2 percent by weight of a lightfastness antioxidant and 6 percent by weight of a colorant. The mixture can then be heated to a temperature of about 100° C. and stirred for a period of about 60 minutes until a homogeneous solution was generated, and subsequently cooling to 25° C.

The inks of the present invention are suitable for printing processes wherein the substrate, such as paper, transparency material, or the like, is heated during the printing process to facilitate formation of the liquid crystalline phase within the ink. When transparency substrates are employed, temperatures typically are about 100° C. to about 110° C., since the polyester typically employed as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention are particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. This then causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require it is beleived the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of page width ejector arrays, ranging from (i) single row, sparse arrays for hybrid forms of parallel/serial printing to (ii) multiple row staggered arrays with individual ejectors for each of the pixel positions or addresses within a page-width image field (i.e., single ejector/pixel/line) for ordinary line printing. Inks suitable for acoustic ink jet printing typically are liquid at ambient temperatures (i.e., about 25° C.), however in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Acoustic-loss Measurements recited herein were measured as follows: samples, about 5 grams, of various liquid vehicles and solid alcohol compounds were placed between two transducers, with the temperature set at 150° C. The samples were allowed to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and with three samples of the same material. The attenuation dB/mm was then calculated by ratioing the amplitude values obtained at different separation distances. A number of the liquid vehicles had dB/mm values of about 15 to about 40, and a number of the solid compounds had dB/mm values of about 20 to about 55.

The optical density measurements were obtained on a Pacific pectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

The lightfast values of the ink jet images were measured in the Mark V Lightfast Tester obtained from Microscal Company, London, England.

The waterfast values of the ink jet images were obtained from the optical density data recorded before and after washing with hot [50° C.] water for two minutes.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE 1

A black semi-solid hot melt ink composition was prepared by mixing 35 percent by weight of the liquid alcohol vehicle 1,3-cyclohexanediol, (Aldrich #C10,110-9), with an acoustic-loss value of 17 dB/mm and a boiling point of 247° C., 35 percent by weight of the solid alcohol compound (±)-pantothenol, (Aldrich #29,578-7), that functions to primarily substantially even the surface of paper and which solid has a melting point of 67° C. and an acoustic-loss value of 35 dB/mm, 20 percent by weight of the waterfast quaternary compound benzylcetyldimethyl ammonium chloride monohydrate, melting point 63 ° C. (Aldrich #22,900-8), 2 percent by weight of the UV absorber glycerol 4-amino benzoate, available as Escalol 106, from Van Dyk Corporation, 2 percent by weight of the antioxidant N-stearoyl-4-aminophenol, available as Sucnox-18, from Hexcel Corporation, and 6 percent by weight of the colorant Orasol Black RLP (Ciba-Geigy). The resulting mixture was heated to a temperature of about 100° C. and then stirred for a period of about 60 minutes until it formed a homogeneous solution. The solution was thereafter cooled to 25° C. The resulting black ink had an acoustic loss value of 38 dB/mm and a viscosity of 4.77 cps at 150° C.

EXAMPLE 2

A blue semi-solid hot melt ink composition was prepared by mixing 35 percent by weight of the liquid alcohol vehicle trifluoro methylphenethyl alcohol, (Aldrich #23,035-9), with an acoustic-loss value of about 21 dB/mm and a boiling point of 186° C., 35 percent by weight of the solid alcohol dicyclohexylmethanol, (Aldrich #31,772-1) with a melting point of 62° C. and an acoustic-loss value of 35 dB/mm, 20 percent by weight of the waterfast quaternary compound benzyl stearyl dimethyl ammonium chloride mono hydrate, melting point 68° C. (Aldrich #22,901-6), 2 percent by weight of the UV absorber glycerol 4-amino benzoate, available as Escalol 106, available from Van Dyk Corporation, 2 percent by weight of the antioxidant N-stearoyl-4-aminophenol, available available as Sucnox-18, from Hexcel Corporation, and 6 percent by weight of the colorant Sudan Blue dye (BASF). The resulting mixture was heated to a temperature of about 100° C. and then stirred for a period of about 60 minutes until it formed a homogeneous solution, and subsequently the solution was cooled to 25° C. The resulting black ink had an acoustic loss value of 37 dB/mm and a viscosity of 4.92 cps at 150° C.

EXAMPLE 3

A yellow semi-solid hot melt ink composition was prepared by mixing 35 percent by weight of the liquid alcohol vehicle 3-cyclohexyl-1-propanol, (Aldrich #30,440-9) with an acoustic-loss value of about 20 dB/mm and a boiling point of 218° C., 35 percent by weight of the solid alcohol (2) 1,3-dioxane-5,5-dimethanol, (Aldrich #22,062-0) with a melting point of 59° C. and an acoustic-loss value of 24 dB/mm, 20 percent by weight of the waterfast quaternary compound benzyl tetradecyl dimethyl ammonium chloride dihydrate, 64° C. (Aldrich #29,279-6), 2 percent by weight of the UV absorber resorcinol mono benzoate, available as RBM, from Eastman Chemicals, 2 percent by weight of the antioxidant 2,6-di-tert-butyl-4-cresol, available as Vulkanox KB, from Mobay Chemicals, and 6 percent by weight of the colorant Sudan yellow dye (BASF). The mixture resulting was heated to a temperature of about 100° C. and stirred for a period of about 60 minutes until it formed a homogeneous solution, and the solution was subsequently cooled to 25° C. The resulting yellow ink had an acoustic loss value of 41 dB/mm and a viscosity of 4.95 cps (centipoise) at 150° C.

EXAMPLE 4

A red semi-solid hot melt ink composition was prepared by mixing 35 percent by weight of the liquid alcohol 2-ethoxy benzyl alcohol, 265 (Aldrich #19,066-7), having an acoustic-loss value of about 22 dB/mm and a boiling point of 265° C., 35 percent by weight of the solid alcohol 3,6-dithia-1,8-octanediol, (Aldrich #23,533-4) with a melting point of 63° C. and an acoustic-loss value of 30 dB/mm, 20 percent by weight of the waterfast quaternary compound cetylpyridinium bromide monohydrate, melting point 69° C. (Aldrich #28,531-5), 2 percent by weight of the UV absorber resorcinol mono benzoate, available as RBM, from Eastman Chemicals, 2 percent by weight of the antioxidant 2,6-di-tert-butyl-4-cresol, available as Vulkanox KB, from Mobay Chemicals, and 6 percent by weight of the colorant Sudan Red dye (BASF). The mixture was heated to a temperature of about 100° C. and stirred for a period of about 60 minutes until it formed a homogeneous solution, and subsequently the mixtures was cooled to 25° C. The resulting red ink had an acoustic loss value of 42 dB/mm and a viscosity of 5.07 cps at 150° C.

Each of the above prepared four inks were incorporated into an acoustic ink jet printing test fixture utilizing the ejection mechanism disclosed in *J. Appl. Phys.* 65(9), May 1, 1989, and references therein, the disclosure of which are totally incorporated hereing by reference. A jetting frequency of 160 MHz was used to generate drops of about 2 picoliters, up to 12 drops per pixel at 600 spi. The images formed exhibited excellent color quality with optical density values of 1.70 (black), 1.61 (cyan), 1.41 (magenta), 0.91 (yellow), sharp edges, with lightfastness and waterfastness values of greater than about 98 percent and more specifically from about 98.3 to about 98.8.

EXAMPLE 5

A black semi-solid hot melt ink composition was prepared by mixing 35 percent by weight of the liquid 2-(2-aminoethylamino) ethanol, (Aldrich #12,758-2) having an acoustic-loss value of about 21 dB/mm and a boiling point of 240° C., 35 percent by weight of the solid alcohol (+)-cis-p-menthane-3,8-diol, (Aldrich #38,404-6) with a melting point of 64° C. and an acoustic-loss value of 35 dB/mm, 20 percent by weight of the waterfast quaternary compound hexadecyltributylphosphonium bromide, melting point 57° C. (Aldrich #27,620-0), 2 percent by weight of the UV absorber octyl dimethyl amino benzoate, available as Escalol 507, from Van Dyk Corporation, 2 percent by weight of the antioxidant 2,6-di-tert-butyl-α-dimethyl amino-4-cresol, available as Ethanox 703, from Ethyl Corporation, and 6 percent by weight of the colorant Orasol Black RLP (Ciba-Geigy). The resulting mixture was heated to a temperature of about 100° C. and then stirred for a period of about 60 minutes until it formed a homogeneous solution and subsequently the solution resulting was cooled to 25° C. The black ink obtained had an acoustic loss value of 42 dB/mm and a viscosity of 4.83 cps at 150° C.

EXAMPLE 6

A blue semi-solid hot melt ink composition was prepared by mixing 35 percent by weight of the liquid decyl alcohol, (Aldrich #23,976-3), having an acoustic-loss value of about 23 dB/mm and a boiling point of 231° C., 35 percent by weight of the solid alcohol (−)-trans-p-menthane-3,8-diol, (Aldrich #38,405-4) with a melting point of 69° C. and an acoustic-loss value of 39 dB/mm, 20 percent by weight of the waterfast quaternary compound 1-dodecylpyridinium chloride hydrate, melting point 68° C. (Aldrich #33,124-4), 2 percent by weight of the UV absorber octyl dimethyl amino benzoate, available as Escalol 507, from Van Dyk Corporation, 2 percent by weight of the 2,6-di-tert-butyl-α-dimethyl amino-4-cresol, available as Ethanox 703, from Ethyl Corporation, and 6 percent by weight of the colorant Sudan Blue dye (BASF). The mixture was heated to a temperature of about 100° C. (Centigrade throughout) and stirred for a period of about 60 minutes until it formed a homogeneous solution, and subsequently the solution resulting was cooled to 25° C. The black ink obtained had an acoustic loss value of 43 dB/mm and a viscosity of 4.82 cps at 150° C.

EXAMPLE 7

A yellow semi-solid hot melt ink composition was prepared by mixing 35 percent by weight of the liquid nonyl alcohol, (Aldrich #13,121-0) having an acoustic-loss value of about 20 dB/mm and a boiling point of 215° C., 35 percent by weight of the solid (±)-trans-p-menthane-3,8-diol, (Aldrich #38,405-4) with a melting point of 69° C. and an acoustic-loss value of 39 dB/mm, 20 percent by weight of the waterfast quaternary compound tetramethylammonium fluoride tetrahydrate, melting point 40° C. (Aldrich #10,721-2), 2 percent by weight of the UV absorber hexadecyl 3,5-di-tert-butyl-4-hydroxy-benzoate, Aldrich #41, 320-8, melting point 60° C., 2 percent by weight of the antioxidant 2,2'-isobutylidene-bis(4,6-dimethyl phenol), available as Vulkanox NKF, from Mobay Chemicals, and 6 percent by weight of the colorant Sudan yellow dye (BASF). The mixture resulting was heated to a temperature of about 100° C. and stirred for a period of about 60 minutes until it formed a homogeneous solution, and subsequently the solution was cooled to 25° C. The resulting yellow ink had an acoustic loss value of 41 dB/mm and a viscosity of 4.92 cps at 150° C.

EXAMPLE 8

A red semi-solid hot melt ink composition was prepared by mixing 35 percent by weight of the liquid nonyl alcohol, (Aldrich #13,121-0) having an acoustic-loss value of about 20 dB/mm and a boiling point of 215° C., 35 percent by weight of the solid 1-adamantane ethanol, MP (Aldrich #18,811-5) with a melting point of 68° C. and an acoustic-loss value of 42 dB/mm, 20 percent by weight of the waterfast quaternary compound tetraoctylphosphonium bromide, melting point 41° C. (Aldrich #44,213-5), 2 percent by weight of the UV absorber hexadecyl 3,5-di-tert-butyl-4-hydroxybenzoate, Aldrich #41,320-8, melting point 60° C., 2 percent by weight of the antioxidant 2,2'-isobutylidene-bis (4,6-dimethyl phenol), available as Vulkanox NKF, from Mobay Chemicals, and 6 percent by weight of the colorant Sudan Red dye (BASF). The mixture was then heated to a temperature of about 100° C. and stirred for a period of about 60 minutes until it formed a homogeneous solution, and subsequently the solution resulting was cooled to 25° C. The red ink resulting had an acoustic loss value of 42 dB/mm and a viscosity of 4.82 cps at 150° C.

Each of the above four prepared inks were incorporated into an acoustic ink jet printing test fixture utilizing the ejection mechanism disclosed in *J. Appl. Phys.* 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality with optical density values of 1.62 (black), 1.64 (cyan), 1.43 (magenta), 0.92 (yellow), sharp edges, with lightfastness and waterfastness values of greater than 99 percent, and more specifically from about 99.2 to about 99.7.

Other modifications of the present invention may occur to those of ordinary skill in the art subsequent to a review of the present application, and these modifications, including equivalents thereof, are intended to be included within the scope of the present invention.

What is claimed is:

1. A nonaqueous ink composition comprised of (1) a liquid alcohol vehicle with an acoustic-loss value of from about 5 to about 40 dB/mm, (2) a solid alcohol component with a melting point of from about 35 to about 74° C. and an acoustic-loss value of from about 25 to about 80 dB/mm, (3) a quaternary compound with a melting point of from about 40 to about 80° C., (4) a lightfastness UV absorber, (5) a lightfastness antioxidant, and (6) a colorant.

2. A nonaqueous ink composition in accordance with claim 1 wherein the liquid alcohol vehicle is present in an amount of from about 0.5 to about 49 percent by weight, the solid alcohol component is present in an amount of from about 0.5 to about 49 percent by weight, the quaternary compound is present in an amount of from about 69 to about 1 percent by weight, the UV absorber is present in an amount of from about 5 to about 0.25 percent by weight, the antioxidant is present in an amount of from about 5 to about 0.25 percent by weight, and the colorant is present in an amount of from about 0.5 to about 20 percent by weight, and wherein the total of said ink components is about 100 percent, and which ink possesses an acoustic-loss value of from about 10 to about 80 dB/mm, and which ink possesses a viscosity of from about 1 centipoise to about 10 centipoise at a temperature of from about 125° C. to about 165° C.

3. A nonaqueous ink in accordance with claim 1 wherein the liquid alcohol vehicle is selected from the group consisting of (a) cyclic alcohols, (b) alkyl alcohols, (c) amino alcohols, (d) benzyl alcohols, and (e) phenethyl alcohols.

4. A nonaqueous ink in accordance with claim 1 wherein said liquid alcohols are selected from the group consisting of (1) (S)-2-(tert-butoxycarbonylamino)-3-cyclohexyl-1-propanol, (2) cycloheptanol, (3) cycloheptane methanol, (4) 1,4-cyclohexane dimethanol, (5) 1,3-cyclohexanediol, (6) cyclohexyl methanol, and (7) 3-cyclohexyl-1-propanol.

5. A nonaqueous ink in accordance with claim 3 wherein said alkyl alcohols are selected from the group consisting of (1) hexyl alcohol, (2) heptyl alcohol, (3) octyl alcohol, (4) nonyl alcohol, (5) decylalcohol, (6) undecyl alcohol, (7) 1-dodecanol, (8) 1,5, pentane diol, and (9) 1,7-heptane diol.

6. A nonaqueous ink in accordance with claim 3 wherein said amino alcohols are selected from the group consisting of (1) 2-(2-amino ethoxy) ethanol, (2) 2-(2-aminoethylamino) ethanol, (3) 3-acetyl-1-propanol, (4) amino -1-propanol, (5) 2-amino-1-butanol, (6) 4-amino-1-butanol, (7) 2-amino-3-methyl-1-butanol, (8) DL-2-amino-1-hexanol, and (9) (S)-(–)-N-(tert-butoxy carbonyl) leucinol.

7. A nonaqueous ink in accordance with claim 3 wherein said benzyl alcohols are selected from the group consisting of (1) benzyl alcohol, (2) 3-methyl benzyl alcohol, (3) 2-methoxy benzyl alcohol, (4) 3-methoxybenzyl alcohol, (5) 4-methoxy benzyl alcohol, (6) 2-ethoxy benzyl alcohol, (12) 3,4,5-trimethoxy benzyl alcohol, (7) 3-chloro benzyl alcohol, (8) 2,4-dimethyl benzyl alcohol, (9) 2,5 dimethyl benzyl alcohol, and (10) 3,5-dimethyl benzyl alcohol.

8. A nonaqueous ink in accordance with claim 3 wherein said phenethyl alcohols are selected from the group consisting of (1) phenethylalcohol, (2) 2-hydroxy phenethyl alcohol, (3) 3-hydroxy phenethyl alcohol, (4) 2-amino phenethylalcohol, (5) trifluoro methylphenethyl alcohol, and (6) 3-phenyl-1-propanol.

9. A nonaqueous ink in accordance with claim 1 wherein the solid alcohol is selected from the group consisting of (a) cyclic alcohols, (b) linear mono alcohols, (c) linear diols, (d) benzyl alcohols, and (e) phenyl alcohols.

10. A nonaqueous ink in accordance with claim 9 wherein said solid alcohol is a cyclic alcohol selected from the group consisting of (1) (tert-butoxy carbonyl)-2-pyrolidine methanol, (2) 1,3-dioxane-5,5-dimethanol, (3) 1-(4-chlorophenyl)-1-cyclopentane methanol, (4) dicyclohexylmethanol, (5) 4-tert-butyl cyclohexanol, (6) 3-aminomethyl-3,5,5-trimethylcyclohexanol, (7) 2,2,6,6-tetrachloro cyclohexanol, (8) 1-adamantane ethanol, (9) 2-amino-3-cyclohexyl- (5) cis-3,5-cyclo hexadiene-1,2-diol, and (10) (+)-cis-p-methane-3,8-diol.

11. A nonaqueous ink in accordance with claim 9 wherein said solid mono alcohols are selected from the group consisting of (1) 5-amino-1-pentanol, (2) nitromethanetrispropanol, (3) 3-chloro-1-phenyl-1-propanol, (4) 6-amino-1-hexanol, (5) 2,2,3,3,4, 4,5,5,6,6, 7,7,8,8, 9,9,9-hepta deca fluoro-1-nonanol, (6) 1-tetra decanol, (7) 1-penta decanol, (8) 1-hexadecanol, (9) 1-eicosanol, (10) 1-docosanol, (11) 11-bromo-1-undecanol, and (12) 12-bromo-1-dodecanol.

12. A nonaqueous ink in accordance with claim 9 wherein said solid linear diols are selected from the group consisting of (1) 1,6-hexane diol, (2) 1,2-octane diol, (3) 1,8-octane diol, (4) 1,9-nonane diol, (5) 1,10-decane diol, (6) 1,2-decane diol, (7) 1,2-dodecane diol, (8) (1,2-tetradecane diol, (9) 2-methyl-2-propyl-1,3-propanediol, (9) 2,2-diethyl-1,3-propanediol, (10) (2-(hydroxy methyl)-1,3-propanediol, and (10) 2,2,4-trimethyl-1,3-pentanediol.

13. A nonaqueous ink in accordance with claim 9 wherein said solid benzyl alcohols are selected from the group consisting of (1) 4-butoxy benzyl alcohol, (2) 4-ethoxy benzyl alcohol, (3) 2-phenyl benzyl alcohol, (4) 2,4-dimethoxy benzyl alcohol, (5) α-methyl-2-(trifluoromethyl) benzyl alcohol, (6) 2-chloro-6-fluorobenzyl alcohol, (7) 3-benzyloxy benzyl alcohol, (8) 3,5-dimethoxy benzyl alcohol, (9) 2,3-dimethoxy benzyl alcohol, and (10) 3,5-bis (trifluoromethyl) benzyl alcohol.

14. A nonaqueous ink in accordance with claim 9 wherein the solid phenyl alcohols are selected from the group consisting of (1) 2-phenyl-2-propanol, (2) 3-(4-hydroxy phenyl)-1-propanol, (3) (S)-(–)-1-phenyl-1-butanol, (4) 2-amino-1-phenyl ethanol, (5) 4-methoxy phenethyl alcohol, (6) 3,4-dimethoxy phenethyl alcohol, (7) 2-phenyl-1,2-propane diol, (8) 3-phenoxy-1,2-propane diol, (9) 3-methoxycatechol, and (10) cinnamylalcohol.

15. A nonaqueous ink in accordance with claim 1 wherein the quaternary compound is selected from the group consisting of (1) benzylcetyldimethyl ammonium chloride monohydrate, (2) benzylstearyldimethyl ammonium chloride mono hydrate, (3) benzyl tetradecyl dimethyl ammonium chloride dihydrate, (4) cetyl pyridinium bromide monohydrate, (5) hexadecyltributylphosphonium bromide, (6) 1-dodecylpyridinium chloride hydrate, (7) tetramethylammonium fluoride tetrahydrate, (8) perfluoro decyl iodide, and (9) tetraoctylphosphonium bromide.

16. A non aqueous ink in accordance with claim 1 wherein the lightfastness UV absorbing is an ester selected from the group consisting of (1) glycerol 4-amino benzoate, (2) resorcinol mono benzoate, (3) octyl dimethyl amino benzoate, (4) hexadecyl 3,5-di-tert-butyl-4-hydroxybenzoate, (5) octyl salicylate, and (6) octyl methoxy cinnamate.

17. A non aqueous ink in accordance with claim 1 wherein the lightfastness antioxidant is selected from the group consisting of (1) N-stearoyl-4-aminophenol, (2) 2,6-di-tert-butyl-4-cresol, (3) 2,6-di-tert-butyl-α-dimethylamino-4-cresol, (4) 2,2'-isobutylidene-bis(4,6-dimethyl phenol), (5) N-isopropyl-N'-phenyl-phenylene diamine, (6) N-(1,3-dimethylbutyl)-N'-phenylphenylene-diamine, (7) N,N'-di(2-octyl)-4-phenylene diamine, (8) N,N'-bis (1,4-dimethyl pentyl)-4-phenylene diamine, and (9) 2,4,6-tris-(N-1,4-dimethyl-pentyl-4-phenylene diamino)-1,3,5-triazine.

18. A printing process which comprises incorporating into an acoustic ink jet printer the ink of claim 1 and causing droplets of the ink to be ejected in imagewise pattern onto a substrate.

19. A process which comprises (a) providing an acoustic ink printer having a pool of the ink of claim 1 with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

20. An ink in accordance with claim 1 wherein the colorant is selected in an amount of from about 0.5 to about 20 percent by weight.

21. An ink in accordance with claim 1 wherein the colorant is a dye.

22. An ink in accordance with claim 1 wherein the colorant is a dye of cyan, magneta, yellow, black, or mixtures thereof.

23. An ink in accordance with claim 1 wherein said (1) liquid alcohol possesses an acoustic-loss value of from about 15 to about 30 dB/mm, (2) said solid alcohol possesses a melting point of from about 45 to about 65° C. and an acoustic-loss value of from about 40 to about 70 dB/mm, (3) said quaternary compound possesses a melting point of from about 50 to about 65° C., and which ink possesses an acoustic-loss value of from about 25 to about 65 dB/mm, and which ink possesses a viscosity of from about 1 centipoise to about 20 centipoise at a temperature of from about 120° C. to about 170° C.

24. An ink in accordance with claim 1 wherein said liquid alcohol is 1,3-cyclohexanediol.

25. An ink in accordance with claim 1 wherein said solid alcohol is dicyclohexyl methanol.

* * * * *